July 21, 1959 J. KURY 2,895,570
PNEUMATIC BRAKE WITH PRESSURE CLOSED VALVE
Filed June 4, 1956
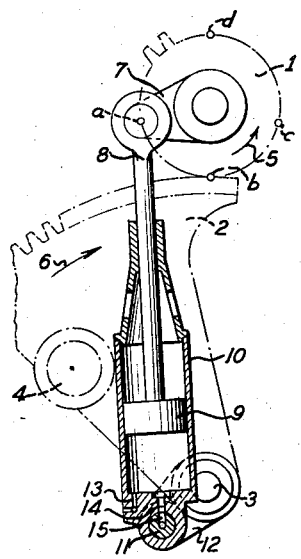
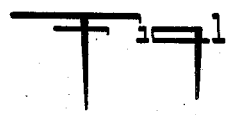
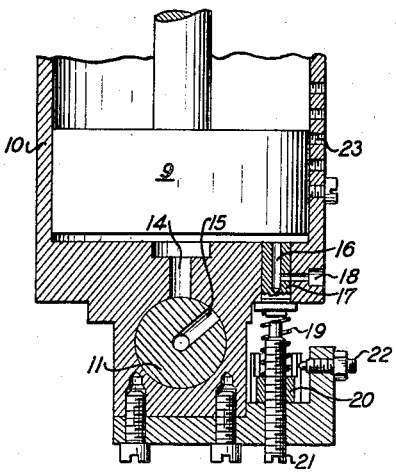

United States Patent Office 2,895,570
Patented July 21, 1959

2,895,570

PNEUMATIC BRAKE WITH PRESSURE CLOSED VALVE

Josef Kury, Pully, near Lausanne, Switzerland, assignor to J. Bobst and Son S.A., Prilly, near Lausanne, Switzerland, a corporation of Switzerland Application June 4, 1956, Serial No. 589,069

Claims priority, application Switzerland June 22, 1955

2 Claims. (Cl. 188—94)

This invention relates to pneumatic brake for decelerating or stopping the rotation of elements, of the kind making use of a mechanism for decelerating or stopping a rotating element by the compression of a gaseous mass. More particularly, it is intended to provide a brake for a rotating element, for instance a shaft, by providing a crank arm rotating with the shaft, a cylinder oscillatable about an axis remote from the shaft, and a piston reciprocating in the cylinder and pivoted to the crank arm so that, upon rotation of the crank arm, compression of the air in the cylinder effects braking of the crank arm and, of course, the shaft. Since the most effective leverage in this arrangement can be obtained when the crank angle is approximately 90 degrees, the elements are so arranged, that compression in the cylinder occurs while the piston rod is substantially tangential to the circle of rotation of the crank arm or, in other words, when the crank angle is substantially 90 degrees. However, under these circumstances a problem arises when rotation of the element resumes, which necessitates passing of the crank to and through dead center or the six o'clock position. This is because the air is highly compressed when the crank angle is 90 degrees, and further braking is undesired. For this reason, the free swing of the crank is made possible by releasing the air compressed by the piston whereby to allow further movement of the piston.

Particular application of such mechanism, as already described in U.S. Letters Patent No. 2,361,739 is to a paper handing machine where the shaft to be controlled constitutes the sprocket shaft for driving chains carrying gripper bars which seize a piece of paper to be worked and carry it around through a series of positions. Obviously, the chains must be stopped frequently, possibly several thousand times an hour. While the stopping positions are highly critical, the inertia and momentum of the chains, the inherent slack, and the masses of the driving elements themselves give rise to serious problems in accurately positioning the pieces of paper for work. In this instance the object of the invention is to stop rotation of the intermittently driven shaft after each complete revolution of the shaft, and this more particularly in machines performing very high speeds.

These and other objects will be apparent in the following specification and drawings in which Fig. 1 shows an embodiment of the already known pneumatic brake according to the cited U.S. Letters Patent No. 2,361,739; whereas Fig. 2 shows a vertical section through the bottom of the cylinder modified according to the present invention, immediately after braking has been achieved.

According to Fig. 1, showing the prior art, the element 1 constitutes the rotative element to be braked. It can turn only in the counterclock direction with regard to the drawing and is intermittently rotated at each up-stroke of toothed sector 2, rotating on the axis 3 under the action of a rod not shown, connected to the sector at 4. The rotative element 1 turns according to arrow 5 each time the sector 2 is displaced in direction of arrow 6, the crank arm 7 being affixed for rotation with element 1.

Rod 8, connected with the said crank arm reciprocates piston 9 in the cylinder 10 pivotally supported on a pivot 11 which is rigid or integral, with crank arm 12 forming a part of sector 2 so as to swing with the sector. The lower end of cylinder 10 is provided with an outlet passage 13 throttled by a needle valve so that as piston 9 moves downwardly, only a limited amount of air escapes under the compression by the piston, as in a dash-pot.

The bottom of cylinder 10 is provided with a further passage 14 which, under certain periodical conditions, registers with an outlet passage 15 through pivot 11.

In operation, presupposing that sector 2 is starting its up-stroke to drive pinion 1 and arm 7 for one complete rotation. Passages 14 and 15 are in registry so that air can escape therethrough, thus allowing relatively unrestrained downward movement of piston 9 towards its lowermost position.

Said passages 14 and 15 become more the more disaligned when the end of the crank moves to the *b* position and then to the *c* position but are unconnected when the *d* position is reached, so that escape of air therethrough is prevented. Air can only escape through the needle throttled passage 13.

The active section of said throttled passage is of course regulable, but can not be modified during work or according to speed variations of the elements to be braked. So it can occur that the said section is too large in the case of high speeds and too little in the case of low speeds.

The object of the present invention is to provide a construction which allows automatic regulation of the section of the channel, through which the air escapes at the end of the braking action.

Fig. 2 of the annexed drawing shows such a mechanism, which will now be described in detail.

In this figure, the bottom of cylinder 10 is represented, with piston 9 in its full braking position, channels 14 and 15 being unconnected. In lieu of the throttled passage 13 of the known art according to Fig. 1, the present invention provides the following auto-regulated air escapement disposition:

A channel 16 communicating with the interior of cylinder 10 is pierced in a sleeve 17 slidable in the bottom of the cylinder and has a side opening normally in connected relationship with an outlet 18.

This normal position is ensured by the action of compression spring 19 disposed between sleeve 17 and a tension regulating nut 20 screwed on the abutment screw 21, intended to limit the stroke of sleeve 17 a locking screw 22 pressing against nut 20 serves to immobilize the said nut and abutment screw together in any desired position.

Now at the end of the braking stroke of piston 9, after the channels 14 and 15 are unconnected, the whole air contained in cylinder 10 must escape through channel 16 and outlet 18. The section of said passages being relatively little a throttling effect takes place which brakes the air flow. Thus the sleeve 17 will be drawn against the spring action and the connecting relationship of channel 16 and outlet 18 more the more reduced.

According to the position of abutment screw 21 the maximum possible throttling action at the end of the stroke of the sleeve will be more or less important but must in no case be complete, i.e. a complete unconnection of channel 16 and outlet 18 preventing any more escapement of the air must in any case be avoided.

Cylinder 10 also is provided with apertures 23, which can be closed by means of screws, in order to regulate air escapement through said apertures when piston 9 is starting its braking stroke, but said apertures are closed when braking action becomes effective.

The action of the described pneumatic brake is that at the begining of the braking stroke, the air contained in the cylinder 10 escapes through such apertures 23 which are not closed, through channels 14, 15 and through the sleeve 17 simultaneously, then only through channels 14, 15 and sleeve 17 and, at the end of the braking action only through the said sleeve.

The displacement of said sleeve will be a function of the speed of the air flow, which in turn is a function of the speed of the piston 9, i.e. of the element to be braked.

So it is clear that this displacement increases with the said speed and that the throttling effect realized by the channel 16 and the outlet 18 increases accordingly. The proposed objective is attained, to have a greater end braking effect at high speeds than at low speeds.

Having now fully described my invention, what I claim is:

1. A pneumatic device comprising a piston, a cylinder defining a bore accommodating said piston, said cylinder including a head defining a first passage communicating with the bore and a second passage radially intersecting said first passage, a hollow sleeve having a central opening and a radial opening communicating therewith, said sleeve being displaceably positioned in the first passage with the central opening communicating with said bore and the radial opening being registerable with said second passage, a support mounted on the head, an abutment threadably adjustable on the support and having an end adjacent said sleeve to limit the displacement thereof, means threadably engaging said abutment for adjustment thereon, a spring intermediate said means and sleeve for controlling rate of displacement of the latter, and means on said support for locking the first said means in position whereby the magnitude and rate of displacement of the sleeve are individually adjustable.

2. A device as claimed in claim 1, wherein the cylinder defines threaded radial openings spaced along said bore, comprising at least one threaded plug for blocking selected of the threaded openings.

References Cited in the file of this patent

UNITED STATES PATENTS

| | | |
|---|---|---|
| 85,113 | Mackerley | Dec. 22, 1868 |
| 2,050,672 | Simon | Aug. 11, 1936 |
| 2,075,857 | Loef | Apr. 6, 1937 |
| 2,161,811 | Grebe | June 13, 1939 |
| 2,361,739 | Bobst | Oct. 31, 1944 |